(12) United States Patent
Snider

(10) Patent No.: US 8,131,667 B1
(45) Date of Patent: Mar. 6, 2012

(54) SYSTEM AND METHOD FOR GENERATING SYNTHETIC CLIENTS

(75) Inventor: William Snider, Scwickley, PA (US)

(73) Assignee: NetApp, Inc., Sunnyvale, CA (US)

( * ) Notice: Subject to any disclaimer, the term of this patent is extended or adjusted under 35 U.S.C. 154(b) by 248 days.

(21) Appl. No.: 11/414,001

(22) Filed: Apr. 28, 2006

(51) Int. Cl.
*G06F 7/00* (2006.01)
*G06F 17/00* (2006.01)

(52) U.S. Cl. .......................... 707/609; 718/1

(58) Field of Classification Search .................... None
See application file for complete search history.

(56) References Cited

U.S. PATENT DOCUMENTS

| | | | |
|---|---|---|---|
| 5,819,292 A | 10/1998 | Hitz et al. | |
| 6,295,557 B1 * | 9/2001 | Foss et al. | 709/224 |
| 6,470,345 B1 * | 10/2002 | Doutre et al. | 707/100 |
| 6,496,847 B1 * | 12/2002 | Bugnion et al. | 718/1 |
| 6,678,734 B1 * | 1/2004 | Haatainen et al. | 709/230 |
| 6,721,686 B2 * | 4/2004 | Malmskog et al. | 702/186 |
| 7,028,182 B1 * | 4/2006 | Killcommons | 713/161 |
| 7,136,800 B1 * | 11/2006 | Vega | 703/23 |
| 7,158,972 B2 * | 1/2007 | Marsland | 1/1 |
| 7,409,494 B2 | 8/2008 | Edwards et al. | |
| 2002/0116593 A1 | 8/2002 | Kazar et al. | |
| 2003/0069957 A1 * | 4/2003 | Malmskog et al. | 709/223 |
| 2003/0093439 A1 * | 5/2003 | Mogi et al. | 707/200 |
| 2003/0182313 A1 * | 9/2003 | Federwisch et al. | 707/200 |
| 2004/0030770 A1 * | 2/2004 | Pandya | 709/223 |
| 2005/0228621 A1 * | 10/2005 | Matsuo et al. | 703/1 |
| 2005/0246382 A1 * | 11/2005 | Edwards | 707/200 |
| 2005/0278382 A1 * | 12/2005 | LaRocca et al. | 707/200 |
| 2006/0168389 A1 * | 7/2006 | Bentley | 711/2 |
| 2006/0248088 A1 * | 11/2006 | Kazar et al. | 707/10 |
| 2006/0259292 A1 * | 11/2006 | Solomon et al. | 703/27 |
| 2006/0294524 A1 * | 12/2006 | Vega | 718/104 |
| 2007/0234342 A1 * | 10/2007 | Flynn et al. | 717/174 |
| 2007/0255814 A1 * | 11/2007 | Green et al. | 709/223 |
| 2010/0106780 A1 * | 4/2010 | Alexander et al. | 709/205 |

OTHER PUBLICATIONS

Michael Franz, Emulating an Operating System on Top of Another, Jun. 2006, vol. 23(6), pp. 677-692.*
Kevin P. Lawton, Bochs: A Portable PC Emulator for Unix/X, Sep. 1996, vol. 1996, issue 29es, pp. 1-6.*

* cited by examiner

*Primary Examiner* — Pierre Vital
*Assistant Examiner* — Taelor Kim
(74) *Attorney, Agent, or Firm* — Cesari and McKenna, LLP

(57) ABSTRACT

A system and method for generating synthetic clients is provided. A synthetic client program, executing on one or more clients of a storage system environment, is invoked by a user. The synthetic client program simulates a plurality of physical clients (synthetic clients), each of which performs one or more operations directed to a storage system. A user may monitor the storage system under load for testing and/or diagnostic purposes.

20 Claims, 11 Drawing Sheets

SYSTEM AND METHOD FOR GENERATING SYNTHETIC CLIENTS

FIELD OF THE INVENTION

The present invention relates to testing storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Often customers of storage system providers deploy one or more storage systems in enterprise-wide installations with tens of thousands of storage system clients. A noted problem arises for storage system developers when testing a storage system adapted to service such a large number of clients. Obviously, it is cost prohibitive for a storage system provider to test a storage system utilizing tens of thousands of physical clients. Typically, the storage system provider constructs a test suite arrangement comprising, at most, hundreds of clients to be utilized for testing the storage system. This testing arrangement often does not adequately place the storage system under a load comparable to that which the storage system experiences in an actual deployment, thereby reducing the utility of the testing.

SUMMARY OF THE INVENTION

The present invention overcomes the disadvantages of the prior art by providing a system and method for generating synthetic clients for use in testing of one or more storage systems. One or more physical client computers are configured with a synthetic client program that simulates any number of physical clients configured to direct data access requests to each storage system for testing purposes. Each simulated physical client (synthetic client) performs a predefined number of data access operations directed to the storage system. Illustratively, the synthetic client is a Network File System (NFS) client comprising of a synthetic client module that interfaces with a packet library embodied as binary code with complete customization at each level of a protocol stack including, e.g., Ethernet, IP, TCP/UDP, NFS, etc. The synthetic client module implements a plurality of synthetic NFS clients which may be associated with a specific client object to enable the synthetic NFS client program to simulate particular types of clients, such as, Solaris, AIX, etc.

In operation, a user desiring to test one or more storage systems invokes the synthetic NFS client program and specifies a number of parameters, including, e.g., (destination) network addresses of the storage systems to be tested. In response, the synthetic NFS client program identifies the appropriate destination network addresses of the storage systems to be tested via, e.g., a command line option set by the user or a network discovery process performed by the synthetic NFS client program. Each synthetic NFS client directs a specified number of operations to the identified storage systems using a specified client access pattern. Moreover, each synthetic NFS client utilizes an arbitrarily generated source network address to thereby create the appearance of large number of physical clients directing data access operations to the storage system. Notably, this aspect of the invention provides a more realistic enterprise wide installation environment. A user, such as an administrator or test engineer, may then monitor the storage system and/or protocol traces associated with network traffic generated by the synthetic NFS clients for debugging and/or storage system testing purposes.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
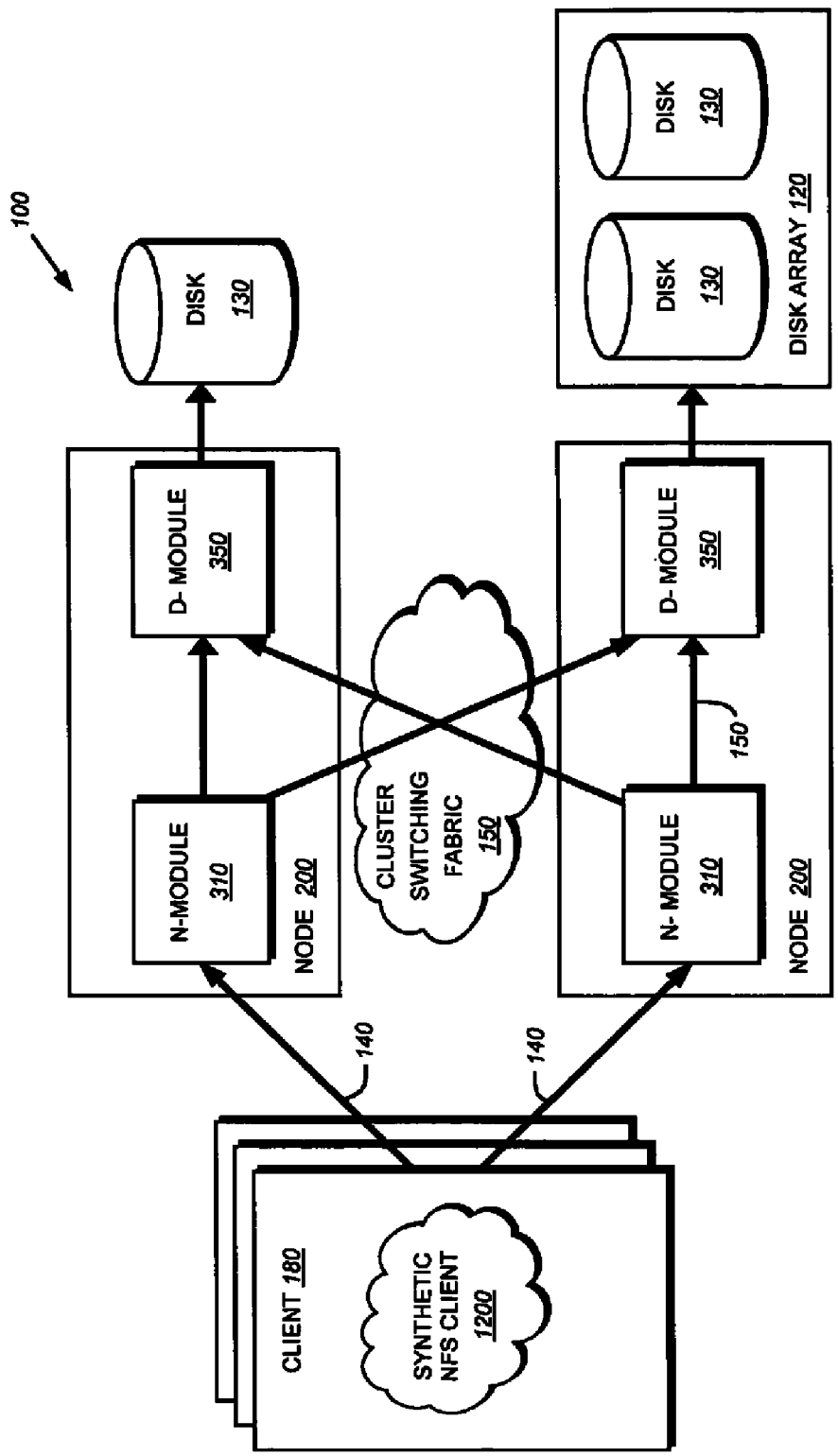
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

As described further herein, a synthetic NFS client program 1200 executes on client 180 to enable testing of a node in accordance with an illustrative embodiment of the present invention. To that end, the synthetic NFS client program 1200 simulates a plurality of physical clients adapted to perform a number of data access operations directed to the node to thereby enable a user to test and/or debug the node 200 and/or software executing thereon. To facilitate such tests, the network 140 includes capabilities for generating protocol traces between the synthetic NFS client program 1200 and the various storage system nodes 200. As used herein, the term synthetic client shall be used to represent a simulated physical client.

B. Storage System Node

Figure 2:
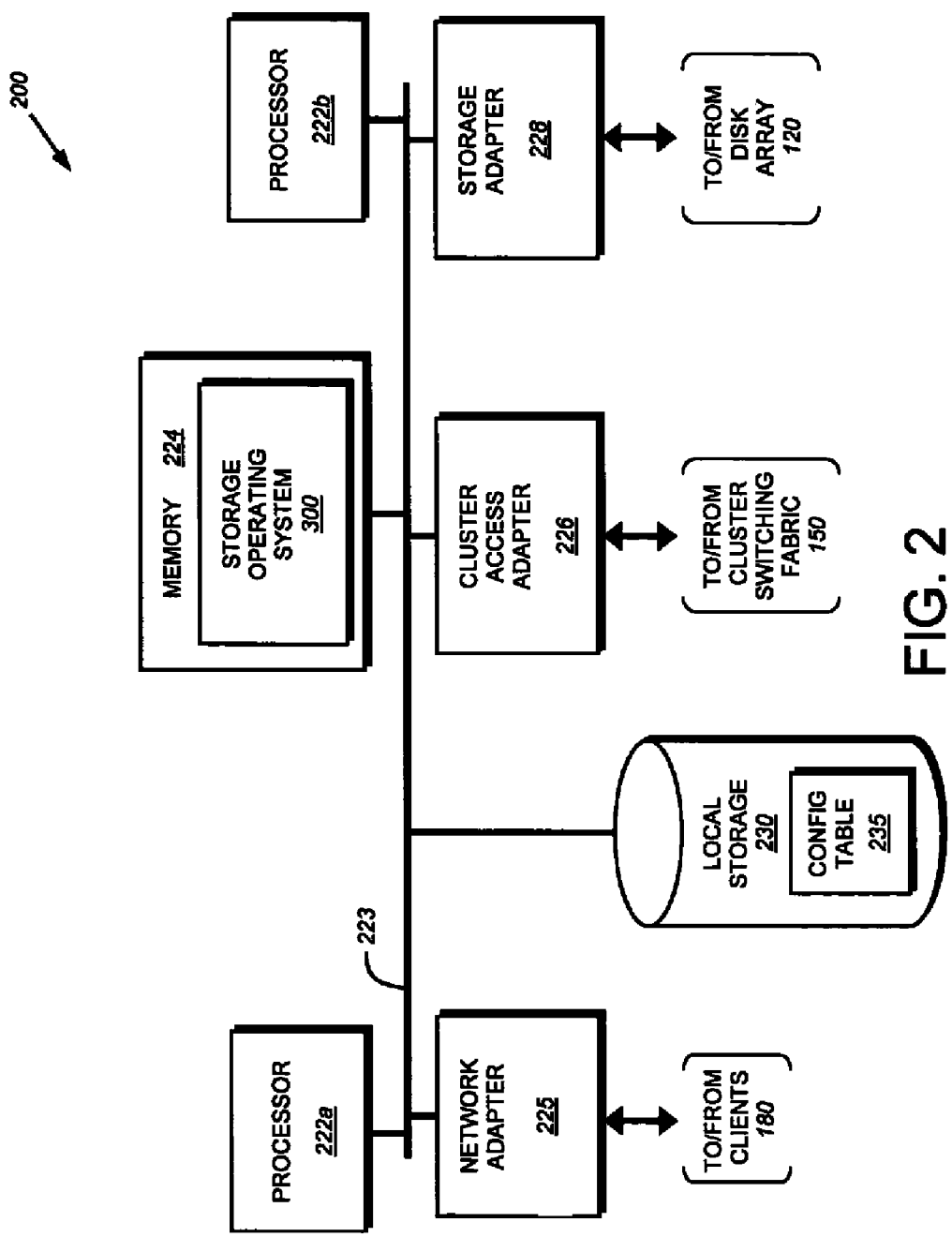
FIG. 2 is a schematic block diagram of a node in accordance with an embodiment of the present invention.

FIG. 2 is a schematic block diagram of a node 200 that is illustratively embodied as a storage system comprising a plurality of processors 222a and 222b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the into formation is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
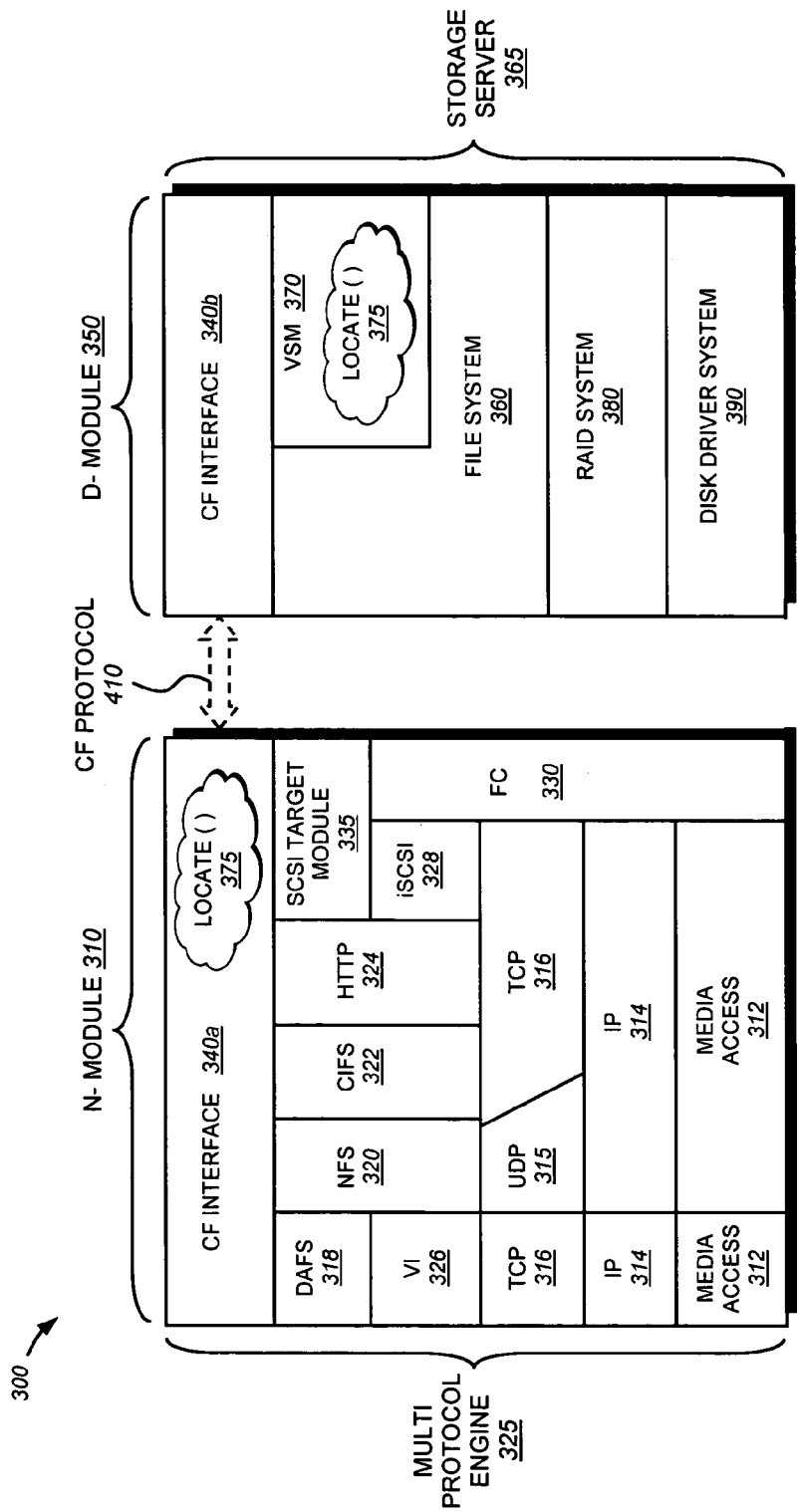
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("Modes") to identify files and file attributes (such as creation time, access permissions, size and block location). The file system uses files to store meta-data describing the layout of its file system; these meta-data files include, among others, an mode file. A file handle, i.e., an identifier that includes an Mode number, is used to retrieve an Mode from disk.

Broadly stated, all modes of the write-anywhere file system are organized into the Mode file. A file system (fs) info block specifies the layout of information in the file system and includes an Mode of a file that includes all other modes of the file system. Each logical volume (file system) has an fsinfo block that is preferably stored at a fixed location within, e.g., a RAID group. The Mode of the mode file may directly reference (point to) data blocks of the Mode file or may reference indirect blocks of the Mode file that, in turn, reference data blocks of the Mode file. Within each data block of the mode file are embedded Modes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the Mode file using the mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the to packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the comes code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication for data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340*b* on D-module 350 de-encapsulates the CF message and processes the file system command.

Figure 4:
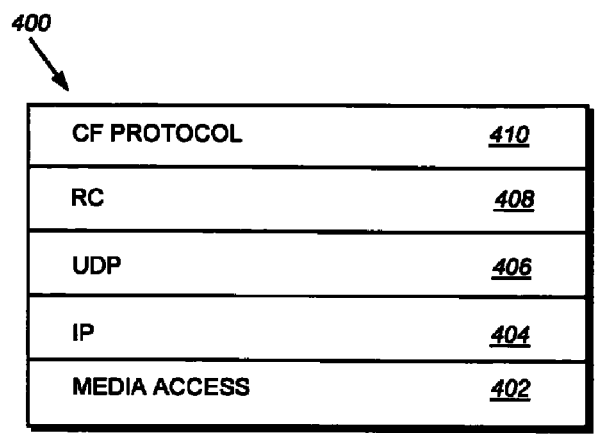
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
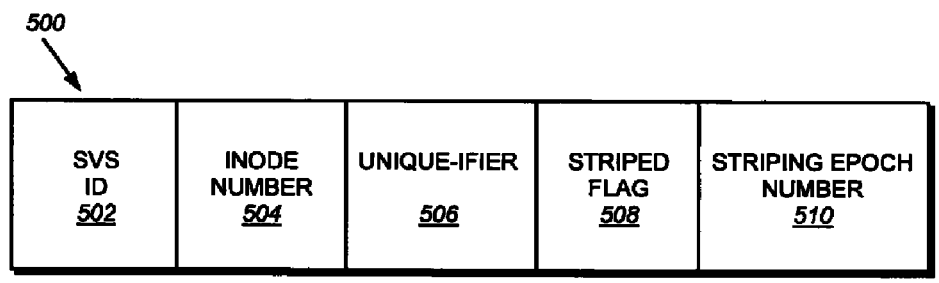
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
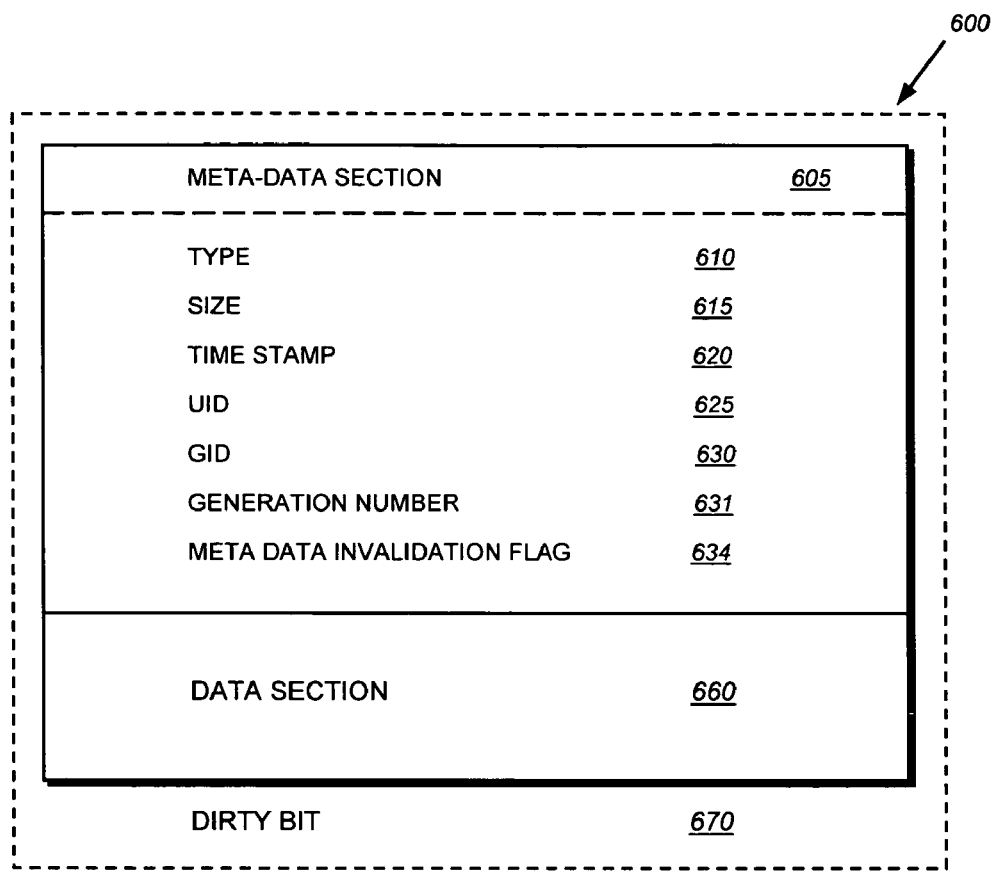
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 634. The contents of the data section 660 of each Mode may be interpreted differently depending upon the type of file (Mode) defined within the type field 610. For example, the data section 660 of a directory mode contains meta-data controlled by the file system, whereas the data section of a regular Mode contains file system data. In this latter case, the data section 660 includes a representation of the data associated with the file.

Specifically, the data section 660 of a regular on-disk Mode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the Mode, file system data having a size that is less than or equal to 64 bytes is represented, in its entirety, within the data section of that Mode. However, if the length of the contents of the data container exceeds 64 bytes but less than or equal to 64 KB, then the data section of the Mode (e.g., a first level Mode) comprises up to 16 pointers, each of which references a 4 KB block of data on the disk.

Moreover, if the size of the data is greater than 64 KB but less than or equal to 64 megabytes (MB), then each pointer in the data section 660 of the Mode (e.g., a second level mode) references an indirect block (e.g., a first level L1 block) that contains 1024 pointers, each of which references a 4 KB data block on disk. For file system data having a size greater than 64 MB, each pointer in the data section 660 of the mode (e.g., a third level L3 mode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk Mode (or block) is loaded from disk 130 into memory 224, its corresponding in-core structure embeds the on-disk structure. For example, the dotted line surrounding the Mode 600 indicates the in-core representation of the on-disk Mode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
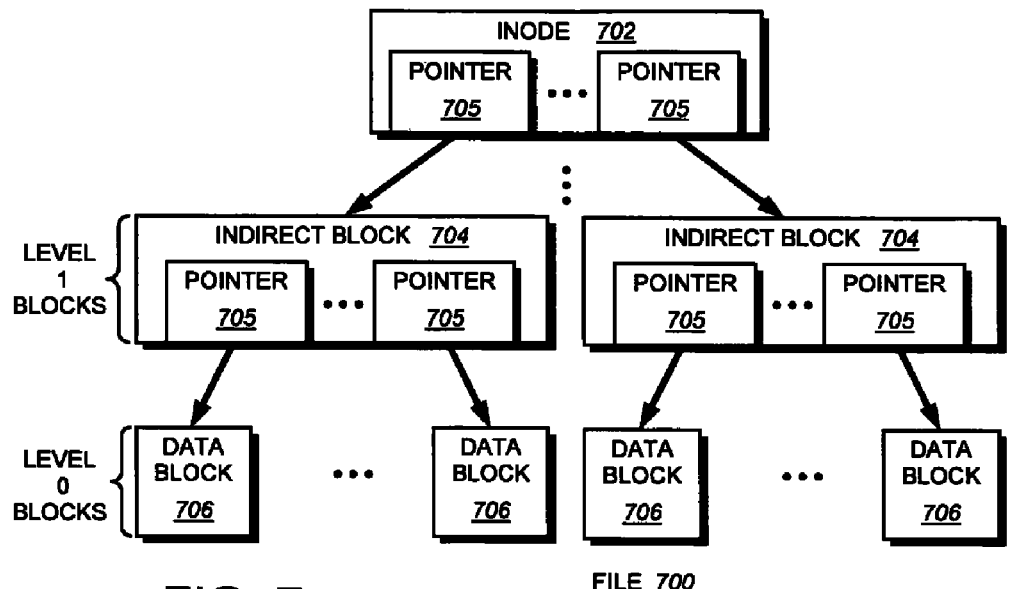
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards, et al. and assigned to Network Appliance, Inc. now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
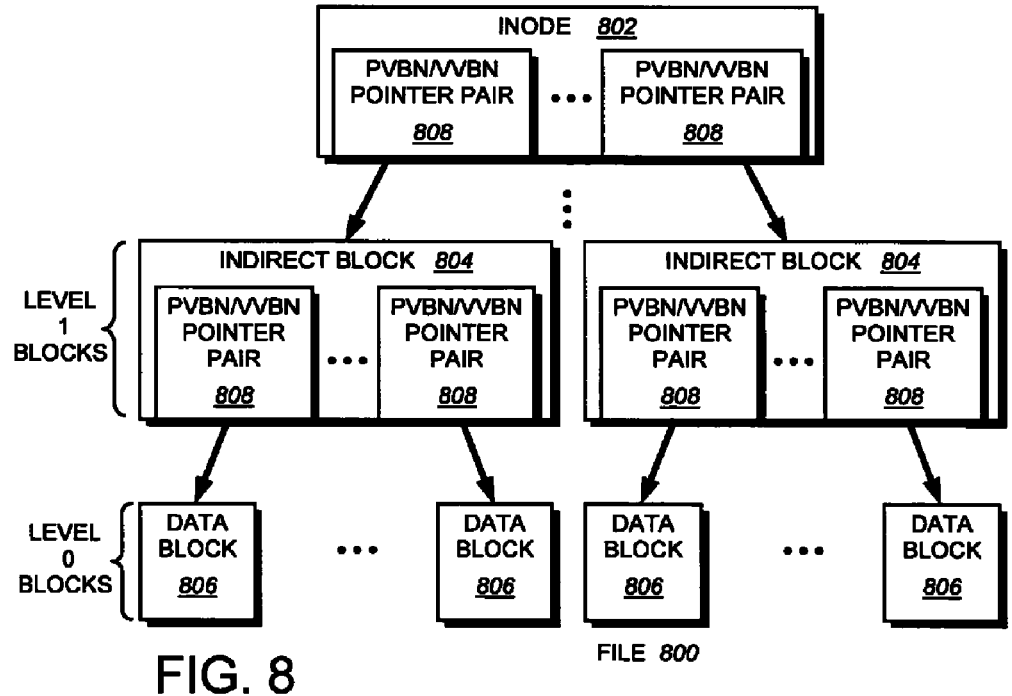
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1(L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
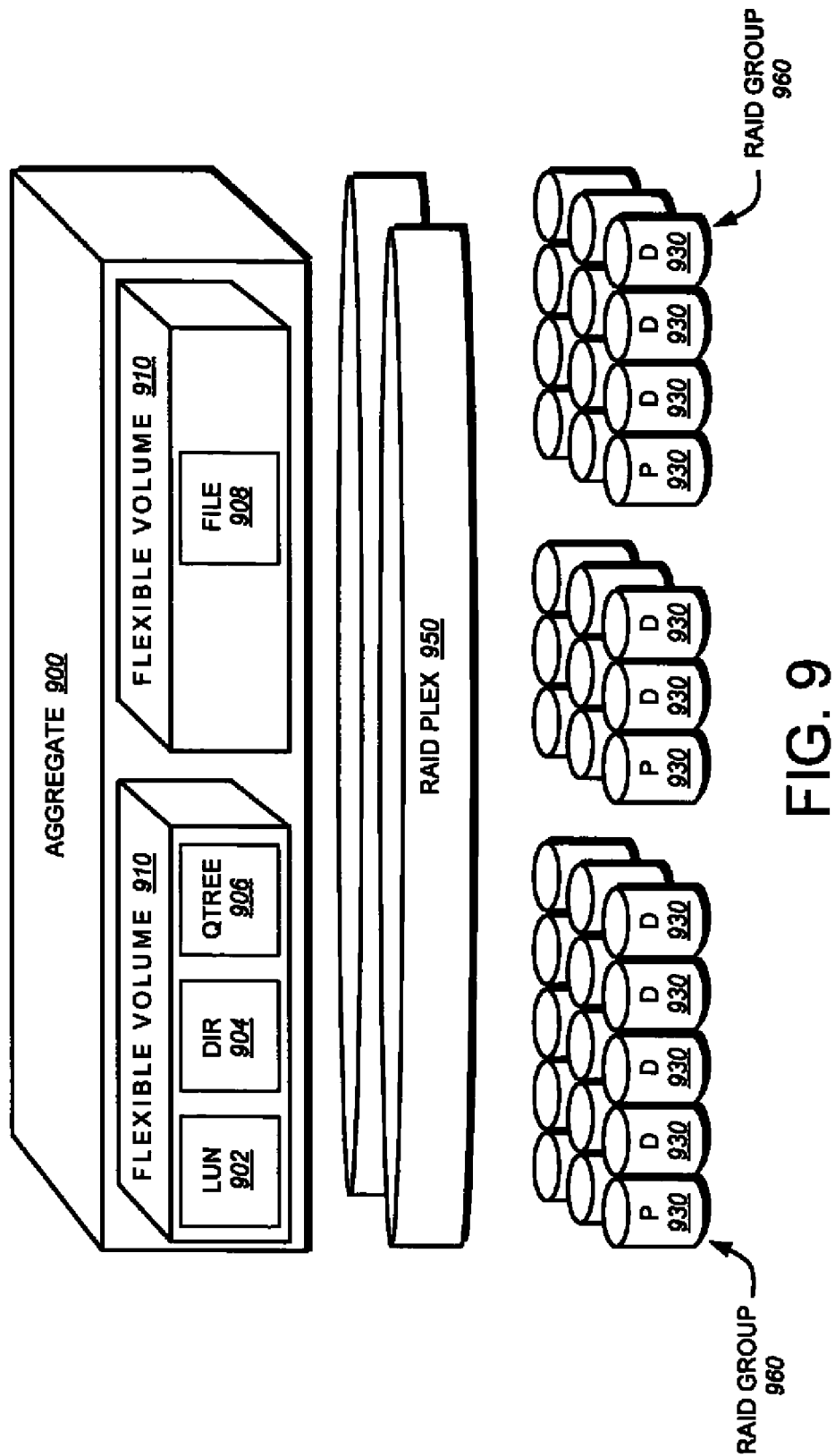
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories HD 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem File, Storage Label File

Specifically, a physical file system (WAFL) directory includes a subdirectory for to each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
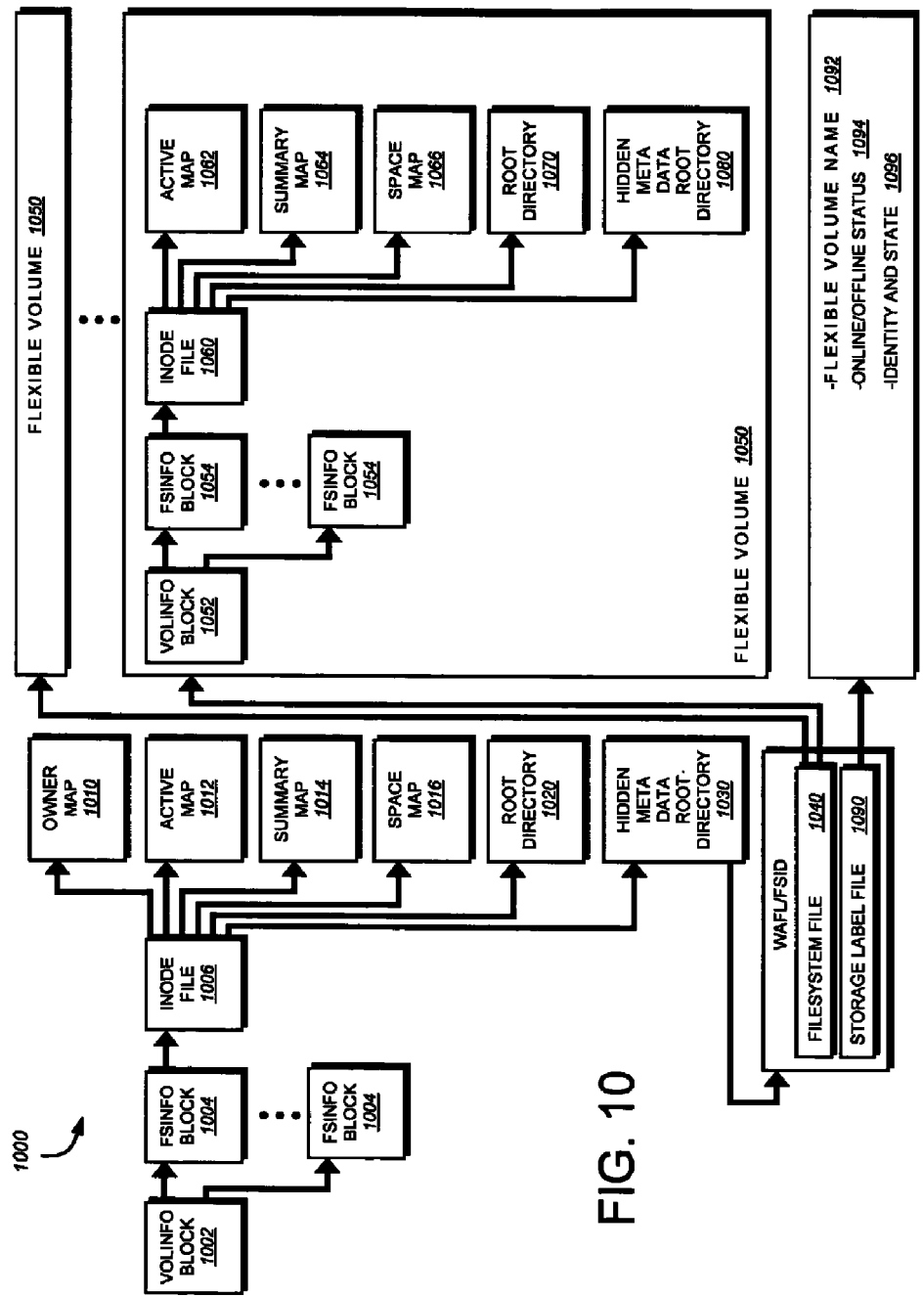
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
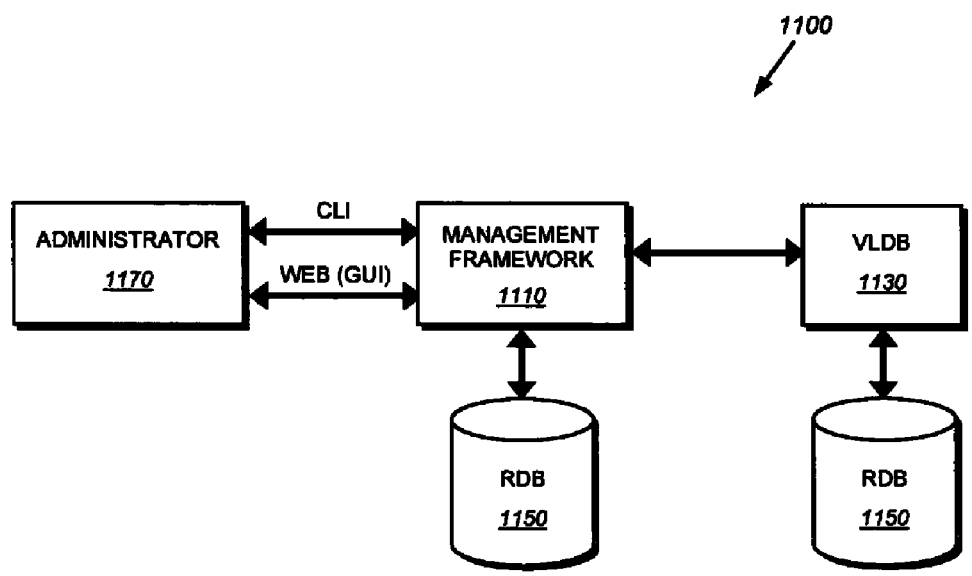
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB to database.

G. Synthetic NFS Client

The present invention overcomes the disadvantages of the prior art by providing a system and method for generating synthetic clients for use in testing of one or more storage systems. One or more physical client computers execute a synthetic client program that simulates any number of physical clients configured to direct data access requests to each storage system for testing/tuning purposes. Each simulated physical client (synthetic client) performs a predefined number of data access operations directed to the storage system. Illustratively, the synthetic client is an NFS client comprising of a synthetic client module that interfaces with a packet library embodied as binary code with complete customization at each level of a protocol stack including, e.g., Ethernet, IP, TCP/UDP, NFS, etc. By complete customization it is meant that each field of each level of the protocol stack may be modified. By invoking function calls into the packet library, a packet with any desired settings may be generated.

The synthetic client module implements a plurality of synthetic NFS clients which may be associated with a specific client object to enable the synthetic NFS client program to simulate particular types of clients, such as, Solaris, AIX, etc.

In operation, a user desiring to test one or more storage systems invokes the synthetic NFS client program and specifies a number of parameters, including, e.g., (destination) network addresses of the storage systems to be tested and a type of client to simulate. In response, the synthetic NFS client program identifies the appropriate destination network addresses of the storage systems to be tested via, e.g., a command line option set by the user or a network discovery process performed by the synthetic NFS client program. Each synthetic NFS client directs a specified number of operations to the identified storage systems using a specified client access pattern. Such specific client access patterns may be utilized to test how a storage system responds to requests from clients using a particular operating system, such as Microsoft Windows, Solaris, etc. Moreover, each synthetic NFS client utilizes a arbitrarily generated source network address to thereby create the appearance of large number of physical clients directing data access operations to the storage system. Notably, this aspect of the invention provides a more realistic enterprise wide installation environment. A user may then monitor the storage system and/or protocol traces associated with network traffic generated by the synthetic NFS clients for debugging and/or storage system testing purposes. Such protocol traces is may be generated using a conventional protocol trace program or a packet sniffing program.

Figure 12:
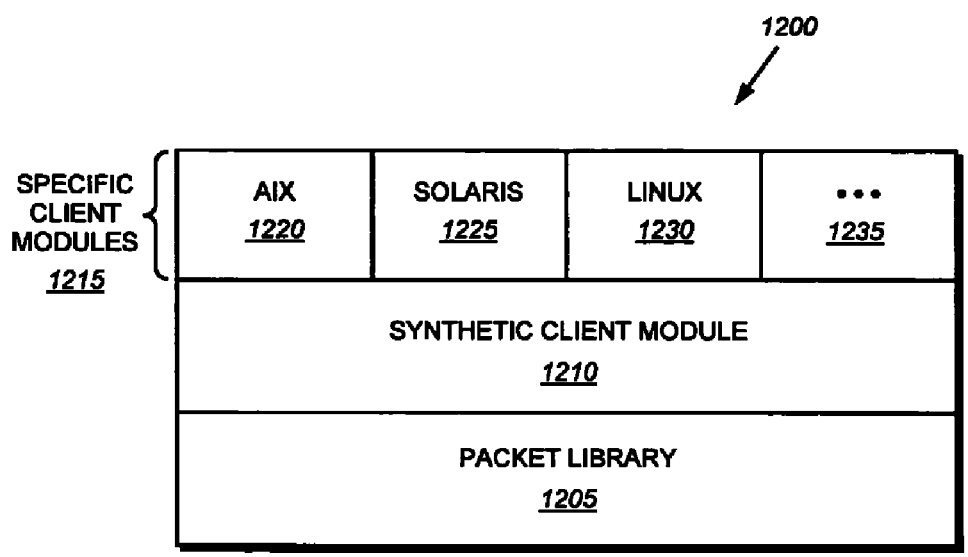
FIG. 12 is a schematic block diagram illustrating an exemplary organization of a synthetic NFS client in accordance with an embodiment of the present invention.

FIG. 12 is a schematic block diagram illustrating an exemplary organization of the synthetic NFS client program 1200 in accordance with an embodiment of the present invention. The synthetic NFS client program 1200 illustratively comprises a packet library 1205, a synthetic client module 1210 and, in alternate embodiments, one or more specific client modules 1215. The packet library 1205 illustratively comprises a binary library configured to generate a protocol packet with individually configurable fields at each level of the protocol stack. For example, the packet library 1205 may generate an NFS packet with any NFS/UDP/IP etc. fields configurably set, including, e.g., a source IP address field set to any arbitrary source network (IP) address.

The synthetic client module 1210 is illustratively a Perl-based object that interfaces with the packet library 1205 to implement one or more synthetic clients in accordance with the present invention. Each specific client module 1215 is an illustrative data object defining a specific type of client implementation. For example, a specific client module 1215 may be provided for AIX 1220, Solaris 1225, Linux 1230 and, in alternate embodiments, additional and/or differing clients 1235, such as Microsoft Windows clients. According to the invention, the synthetic client module 1210 cooperates with the packet library 1205 to simulate any number of physical clients. As noted above, each simulated physical client is termed a synthetic client. Furthermore, the use of one or more specific client modules 1215 enables the synthetic clients to emulate any specific type of NFS client. Specific client modules include such information as order of operations that the specific implementation utilizes, etc. so that the synthetic client can accurately simulate a client of the identified operating system. The specific client modules may be generated by taking protocol traces of physical clients utilizing the protocol.

It should be noted that in alternate embodiments, the synthetic NFS client program 1200 may be implemented using other techniques. For example, the synthetic NFS client program 1200 may be based on executable and program code, rather than (Perl) objects. As such, the description of the synthetic NFS client program 1200 comprising of a single packet library 1205 and a synthetic client module 1210 should be taken as exemplary only.

Figure 13:
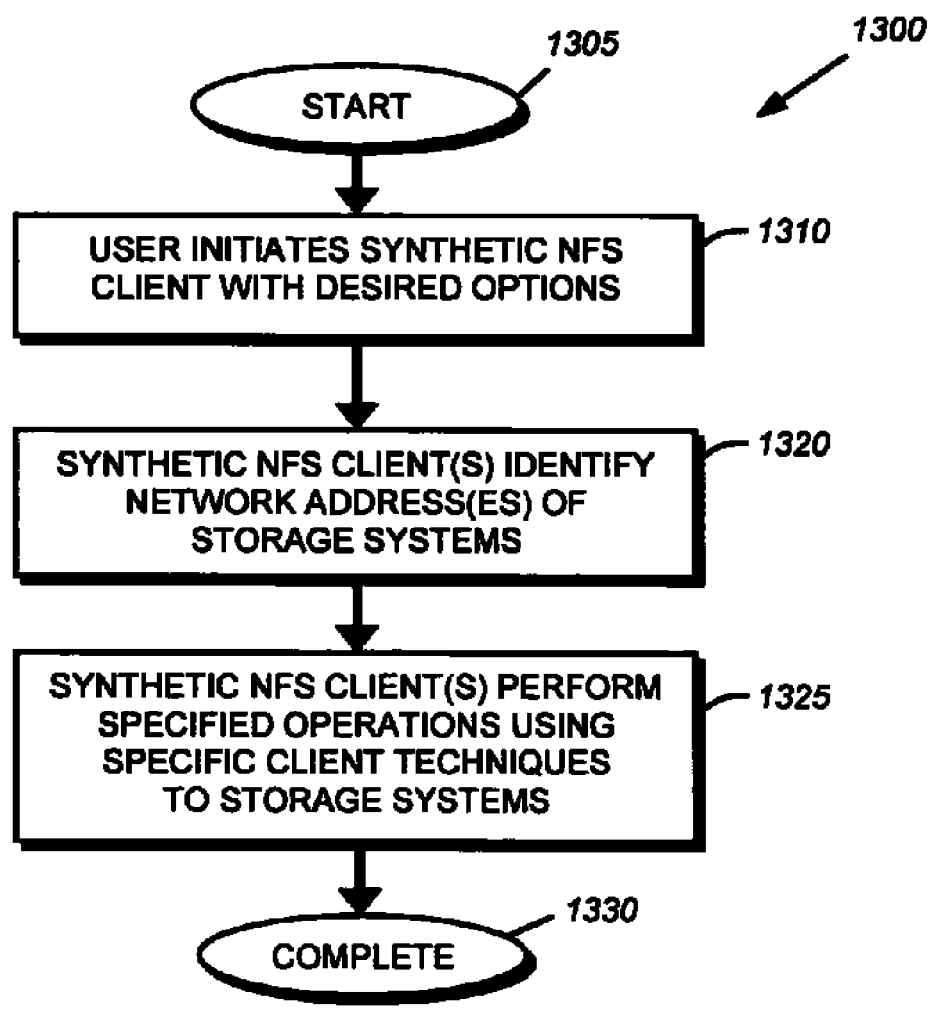
FIG. 13 is a flowchart detailing the steps of a procedure for utilizing a synthetic NFS client in accordance with an embodiment the present invention.

FIG. 13 is a flowchart detailing the steps of a procedure 1300 for generating a plurality of synthetic clients in accordance with an illustrative embodiment of the present invention. The procedure 1300 begins in step 1305 and continues to step 1310 where the user initiates the synthetic NFS client program 1200 with a set of desired options, including, e.g., a number and type of data access operations to be performed, etc. Thus, the user may specify the environment that is to be simulated as well as the type of load placed on the storage system. For example, a user may desire to simulate an actual customer deployment and may therefore configure the synthetic NFS program to simulate a known customer installation. Furthermore, if the user has knowledge of a particular installation or industry segment, the user may configure the synthetic client program 1200 to simulate known access patterns in certain industry segments.

Each instantiation of the synthetic NFS client program 1200 identifies the appropriate network addresses of the storage systems for testing in step 1320. Once the specific addresses have been identified, the synthetic NFS clients perform the specified operations using the specific client techniques directed to the storage systems in step 1325. While each of the synthetic NFS clients is performing the data access operations, a user may monitor storage system performance while under actual deployed (real world) conditions. The procedure then completes in step 1330.

It should be noted that the teachings of the present invention may also be utilized in tuning installations. The synthetic client program may be executed and data gathered as to load handling of the storage system. The storage system configuration may then be modified and another test conducted to determine whether the changed configuration improved/decreased performance of the storage system. Users may then utilize the gathered data to make further tuning improvements to the storage system. By utilizing an iterative approach, storage system configurations may be tuned for optimal performance given their expected load conditions.

The foregoing description has been directed to particular embodiments of this invention. It will be apparent, however, that other variations and modifications may be is made to the described embodiments, with the attainment of some or all of their advantages. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for testing a storage system executing a storage operating system, comprising:
   initiating, on a physical client computer using a first source network address, a synthetic client program, wherein the synthetic client program comprises a packet library configured to generate one or more protocol packets, each protocol packet comprising a plurality of fields, wherein each field of the one or more protocol packets configured to be modified by the packet library, and wherein the physical client computer executes a first operating system;
   simulating a synthetic physical client using the synthetic client program, wherein the synthetic client program further comprises a synthetic client module configured to cooperate with the packet library to implement the synthetic physical client;
   generating a second source network address for the synthetic physical client of the physical client computer that is different than the first source network address;
   performing, by the synthetic physical client, an operation directed to the storage system, wherein the synthetic physical client is configured to perform the operation by using the second source network address and by simulating a second operating system that is different than the first operating system of the physical client computer;
   collecting data regarding the operation, wherein collecting the data comprises collecting a protocol trace of the operation directed to the storage system from the synthetic physical client; and
   modifying a configuration of the storage system based on the collected data.

2. The method of claim 1 further comprising generating packets with a modifiable field for a packet library.

3. The method of claim 1 further comprising specifying a parameter for the synthetic client program, wherein the parameter comprises at least one of a number of synthetic physical clients to simulate and a destination network address of the storage system.

4. The method of claim 1 further comprising determining, by a type of method invoked by a test program of the synthetic client program, a number of operations to be performed by the synthetic physical client.

5. The method of claim 1 wherein performing the operation comprises using a predefined access pattern to emulate the second operating system.

6. A computer-readable storage medium containing executable program instructions executed by a processor comprising:
   program instructions that initiate, on a client computer using a first source network address of a network, a client program, wherein the client program comprises a packet library configured to generate one or more protocol packets, each protocol packet comprising a plurality of fields, wherein each field of the one or more protocol packets configured to be modified by the packet library, and wherein the client computer executes a first operating system;
   program instructions that simulate a client using the client program, wherein the client program further comprises a synthetic client module configured to cooperate with the packet library to implement the simulated client;
   program instructions that generate a second source network address of the network for the simulated client of the client computer that is different than the first source network address;
   is program instructions that configure the simulated client to perform an operation directed over the network to a storage system, wherein the simulated client is configured to perform the operation by using the second source network address and by simulating a second operating system that is different than the first operating system of the client computer;
   program instructions that collect data regarding the operation, wherein collecting the data comprises collecting a protocol trace of the operation directed to the storage system from the simulated client; and
   program instructions that modify a configuration of the storage system based on the collected data.

7. The computer-readable medium of claim 6 further comprising program instructions that specify a parameter for the client program, wherein the parameter comprises at least one of a number of clients to simulate and a destination network address of the storage system.

8. The computer readable-medium of claim 6 further comprising program instructions that determine, by a type of method invoked by a test program of the client program, a number of operations to be performed by the simulated client.

9. The computer-readable medium of claim 6 further comprising program instructions that perform, by the simulated client, the operation using a predefined access pattern to emulate the second operating system.

10. A computer-implemented method, comprising:
    simulating, on a client computer, a first type of synthetic client, the first type of synthetic client using a first source network address of a network wherein simulating comprises generating, by a packet library, one or more protocol packets, each protocol packet comprising a plurality of fields, wherein each field of the one or more protocol packets configured to be modified by the packet library;
    cooperating, by a synthetic client module, with the packet library to implement the first type of synthetic client;
    performing, by the first type of synthetic client, a first access request directed over the network to a storage system, the first access request performed using a first specified technique;
    simulating, on the client computer, a second type of synthetic client, the second type of synthetic client using a second source network address of the network on the client computer; and
    performing, by the second type of synthetic client, a second access request directed to the storage system, the second access request performed using a second specified technique;
    collecting data regarding the first access request, wherein collecting the data comprises collecting a protocol trace of the first access request directed to the storage system from the first type of synthetic client; and
    modifying a configuration of the storage system based on the collected data.

11. The computer-implemented method of claim 10 further comprising selecting the first type of synthetic client from a first group of client types comprising at least one of an AIX client, a Solaris Client, a Linux client, a NFS client, and a Windows client, and selecting the second type of synthetic client from a second group of client types that is different than the selected first client type.

12. The computer-implemented method of claim 10 further comprising generating, arbitrarily, the second source network address.

13. The computer-implemented method of claim 10 further comprising collecting a protocol trace of the first second access request directed to the storage system.

14. The computer-implemented method of claim 10 further comprising simulating known access patterns as the first specified technique.

15. A system, comprising:
- a processor operatively interconnected to a physical client computer configured to execute a synthetic client program, wherein the synthetic client program comprises a packet library configured to generate one or more protocol packets, each protocol packet comprising a plurality of fields, wherein each field of the one or more protocol packets configured to be modified by the packet library, and;
- the synthetic client program configured to simulate a first synthetic physical client with a first source network address, wherein the synthetic client program further comprises a synthetic client module configured to cooperate with the packet library to implement the first synthetic physical client;
- the synthetic physical client further configured to send a first data access operation to a storage system executing a storage operating system;
- the synthetic client program further configured to simulate a second synthetic physical client with a second source network address of the physical client computer that is different than the first source network address; and
- the simulated second physical client configured to send a second data access operation to the storage system; and
- the synthetic physical client further configured to generate a protocol trace of the first data access operation directed to the storage system, wherein a configuration of the storage system is modified based on the collected protocol trace.

16. The system of claim 15 wherein the first synthetic physical client is configured as at least one client type selected from a first group of client types consisting of an AIX client, a Solaris Client, a Linux client, a NFS client, and a Windows client, and the second synthetic physical client is configured as a different client type than the selected first client type.

17. The system of claim 15 wherein at least one of the first and second source network addresses is arbitrarily generated by the synthetic client program.

18. The method of claim 1 wherein the second source network address is arbitrarily generated.

19. The computer-readable medium of claim 6 wherein the second source network address is arbitrarily generated.

20. The method of claim 1, wherein the synthetic physical client comprises an abstraction of the physical client computer configured to appear as an actual physical computer.

* * * * *

UNITED STATES PATENT AND TRADEMARK OFFICE
CERTIFICATE OF CORRECTION

| | | |
|---|---|---|
| PATENT NO. | : 8,131,667 B1 | Page 1 of 3 |
| APPLICATION NO. | : 11/414001 | |
| DATED | : March 6, 2012 | |
| INVENTOR(S) | : William Snider | |

It is certified that error appears in the above-identified patent and that said Letters Patent is hereby corrected as shown below:

In the Specifications:

Col. 5, lines 36-37 should read:
    However, as illustratively described herein, the ~~into formation~~ information
is preferably stored on the disks 130 of array 120. The Col. 7, line 20 should read:
    byte (KB) blocks and using index nodes ("~~Modes~~ inodes") to iden- Col. 7, line 24 should read:
    these meta-data files include, among others, an ~~mode~~ inode file. A Col. 7, line 25 should read:
    file handle, i.e., an identifier that includes an ~~mode~~ inode number, is Col. 7, line 26 should read:
    used to retrieve an ~~mode~~ inode from disk.

Col. 7, line 27 should read:
    Broadly stated, all ~~modes~~ inodes of the write-anywhere file system Col. 7, line 28 should read:
    Are organized into the ~~Mode~~ inode file. A file system (fs) info block Col. 7, line 30 should read:
    Includes an ~~Mode~~ inode of a file that includes all other ~~modes~~ inodes of the Col. 7, line 33 should read:
    A RAID group. The ~~Mode~~ inode of the ~~mode~~ inode file may directly Signed and Sealed this
                                  Twenty-fifth Day of June, 2013

Teresa Stanek Rea
                        *Acting Director of the United States Patent and Trademark Office*

CERTIFICATE OF CORRECTION (continued)
U.S. Pat. No. 8,131,667 B1

Col. 7, line 34 should read:
    Reference (point to) data blocks of the ~~Mode~~ inode file or may Col. 7, line 35 should read:
    Reference indirect blocks of the ~~Mode~~ inode file that, in turn, refer- Col. 7, line 36 should read:
    Ence data blocks of the ~~Mode~~ inode file. Within each data block of Col. 7, line 37 should read:
    The ~~mode~~ inode file are embedded ~~Modes~~ inodes, each of which may ref- Col. 7, line 50 should read:
    The ~~Mode~~ inode file using the ~~mode~~ inode number to access an appropriate Col. 8, line 7 should read:
    Offload some or all of the ~~to~~ packet processing and storage Col. 8, line 14 should read:
    Erally refers to the ~~comes~~ computer-executable code operable on a computer to Col. 10, line 32 should read:
    ~~Mode~~ inode or may be interpreted differently depending upon the type Col. 10, line 33 should read:
    Of file (~~Mode~~ inode) defined within the type field 610. For example, Col. 10, line 34 should read:
    The data section 660 of a directory ~~mode~~ inode contains meta-data Col. 10, line 36 should read:
    Regular ~~Mode~~ inode contains file system data. In this latter case, the Col. 10, line 39 should read:
    Specifically, the data section 660 of a regular on-disk ~~Mode~~ inode Col. 10, line 45 should read:
    Of the ~~Mode~~ inode, file system data having a size that is less than or Col. 10, line 47 should read:
    Section of that ~~Mode~~ inode. However, if the length of the contents of Col. 10, line 49 should read:
    KB, then the data section of the ~~Mode~~ inode (e.g., a first level ~~Mode~~ inode)

CERTIFICATE OF CORRECTION (continued)
U.S. Pat. No. 8,131,667 B1

Col. 10, line 54 should read:
    The data section 660 of the ~~Mode~~ inode (e.g., a second level ~~mode~~inode)

Col. 10, line 58 should read:
    64 MB, each pointer in the data section 660 of the ~~mode~~ inode(e.g., Col. 10, line 59 should read:
    A third level L3 ~~mode~~inode) references a double-indirect block Col. 10, line 66 should read:
    When an on-disk ~~Mode~~ inode (or block) is loaded from disk 130

Col. 11, line 2 should read:
    Ing the ~~Mode~~ inode 600 indicates the in-core representation of the Col. 11, line 3 should read:
    On-disk ~~Mode~~ inode structure. The in-core structure is a block of Col. 12, line 33 should read:
    Present invention. Luns (blocks) 902, directories ~~HD~~ 904, Col. 13, line 8 should read:
    Includes a subdirectory for ~~to~~ each flexible volume in the Col. 14, line 64 should read:
    ~~To~~ database.

Col. 15, line 43 should read:
    Such protocol traces ~~is~~ may be generated using a conventional Col. 16, line 59 should read:
    That other variations and modifications may be ~~is~~ made to the In the Claims:

Col. 18, line 7 should read:
    ~~Is~~ program instructions that configure the simulated client Col. 19, line 8 should read:
    Comprising collecting a protocol trace of the ~~first~~ second